(12) United States Patent
Kim et al.

(10) Patent No.: US 8,009,350 B2
(45) Date of Patent: Aug. 30, 2011

(54) LAPTOP-SIZE HIGH-ORDER HARMONIC GENERATION APPARATUS USING NEAR FIELD ENHANCEMENT

(75) Inventors: Seung-Woo Kim, Yuseong-Gu (KR); Jong-Han Jin, Yuseong-Gu (KR); Seung-Chul Kim, Yuseong-Gu (KR); In-Yong Park, Yuseong-Gu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 459 days.

(21) Appl. No.: 12/366,634

(22) Filed: Feb. 5, 2009

(65) Prior Publication Data
US 2010/0098118 A1    Apr. 22, 2010

(30) Foreign Application Priority Data

Oct. 21, 2008    (KR) .................. 10-2008-0103060

(51) Int. Cl.
*G02F 2/02* (2006.01)
*G02F 1/35* (2006.01)
*H01S 3/10* (2006.01)

(52) U.S. Cl. .............................. 359/328; 372/22; 372/55

(58) Field of Classification Search .......... 359/326–332; 372/21, 22, 55
See application file for complete search history.

(56) References Cited

U.S. PATENT DOCUMENTS

| 4,577,122 | A | * | 3/1986 | Kung ............................ 359/329 |
| 5,461,234 | A | * | 10/1995 | Miyazaki et al. ............. 250/372 |
| 6,812,626 | B2 | * | 11/2004 | Perlo et al. .................... 313/316 |

OTHER PUBLICATIONS

Hashizume, J. and Koyama, F., "Optical near-field enhancement of metal-aperture VCSEL with nano metal particle", Dec. 20, 2004, Device Research Conference, Conference Digest, pp. 154-155.*

* cited by examiner

*Primary Examiner* — Daniel Petkovsek
(74) *Attorney, Agent, or Firm* — Sherr & Vaughn, PLLC

(57) ABSTRACT

Disclosed herein is a laptop-size high-order harmonic generation apparatus using near field enhancement. The laptop-size high-order harmonic generation apparatus using near field enhancement includes a femtosecond laser generator, light transfer means for transferring light output from the femtosecond laser generator, micro patterns formed of metallic thin films and configured to have nano-sized apertures for generating near field enhancement when the light output from the light transfer means passes through the micro patterns, a gas supply unit for supplying inert gas to the light when the light transferred through the light transfer means passes through the micro patterns, and a vacuum chamber for accommodating the micro patterns and the gas supply unit under a vacuum atmosphere.

12 Claims, 6 Drawing Sheets

(a)

(b)

(c)

LAPTOP-SIZE HIGH-ORDER HARMONIC GENERATION APPARATUS USING NEAR FIELD ENHANCEMENT

The present application claims priority to Korean Patent Application No. 10-2008-0103060 (filed on Oct. 21, 2008) which is hereby incorporated by reference in its entirety.

BACKGROUND OF THE INVENTION

1. Field of the Invention

The present invention relates generally to a laptop-size high-order harmonic generation apparatus using near field enhancement, and, more particularly, to a laptop-size high-order harmonic generation apparatus using near field enhancement which can be fabricated in a small size due to no use of a resonator or optical amplification and which can generate coherent Extreme Ultraviolets (EUVs) or soft X rays while maintaining the repetition rate of incident femtosecond laser pulses.

2. Description of the Related Art

EUVs and X-rays have wavelengths shorter than those of visible rays. EUVs and X-rays can improve measurement resolution based on the limitations of diffraction, which are determined by wavelength, in precision measurements using light. EUVs and X-rays can be used in performing micro measurements, which are pertinent to biotechnology, or non-destructive testing using excellent transmission characteristics by expanding the wavelengths to the X-ray region.

In particular, if a light source having excellent coherence is additionally implemented, various types of applications using the interference and diffraction of light can be achieved. Furthermore, EUVs or X-rays can used in precision spectroscopy, frequency standards measurements, etc. in the EUV or X-ray region because the repetition rate of incident femtosecond laser pulses can be maintained.

One of the methods of generating EUVs or X-rays is a method using a synchrotron. Although the generation of EUVs or X-rays using the synchrotron has advantages in that a great amount of high-quality light can be obtained and a variety of wavelength bands can be obtained at the same time, it has a disadvantage in that it is difficult to construct facilities for generating EUVs or X-rays in the laboratory setting because the facilities are of a huge size and are very expensive.

A high-order harmonic generation method using a femtosecond laser has been recently proposed as a method of solving these problems. Accordingly, it is possible to generate coherent EUVs or soft X-rays using a relatively small laboratory apparatus.

In the generation of high-order harmonics, electrons are ionized by applying a high time-varying electric field to an inert gas, such as Argon (Ar), Neon (Ne) or Xenon (Xe), are moved along trajectories, and are then recombined, so energy corresponding to the sum of the ionization energy and kinetic energy of the electrons is generated as light in the EUV or X-ray band.

In order to generate such high-order harmonics, a minimum light intensity of $10^{13}$ w/cm$^2$ is necessary to ionize electrons.

However, a femtosecond laser having a light intensity of about $10^{11}$ W/cm$^2$ uses Chirped Pulse Amplification (CPA), which is optical amplification using an external resonator, in order to fulfill the minimum light intensity for generating high-order harmonics.

When one or two femtosecond lasers having a light intensity of about $10^{11}$ W/cm$^2$ are connected in series and then amplification is performed, the amount of light sufficient to ionize gas atoms is achieved.

Although the CPA method can achieve a critical value for generating high-order harmonics, it cannot maintain the repetition rate of femtosecond laser pulses and has a KHz-level repetition rate. This cannot achieve a repetition rate high enough to allow the CPA method to be applied to precision spectroscopy. Furthermore, there is a significant problem in that the CPA method causes a complexity in the structure and an increase in the size of an apparatus.

SUMMARY OF THE INVENTION

Accordingly, the present invention has been made keeping in mind the above problems occurring in the prior art, and an object of the present invention is to provide a high-order harmonic generation apparatus more effective from the standpoint of the industry, in which an EUV light source having a coherence characteristic is reduced to laptop size by using a surface plasmon resonance phenomenon generated through the interaction between photons of light and the electrons within nano-sized metallic micro patterns (structures) without requiring an existing high-output amplification technology. Furthermore, the high-order harmonic generation apparatus of the present invention can be used in precision spectroscopy or frequency standard measurements in the EUV or X-ray region by virtue of maintaining the repetition rate of femtosecond laser pulses.

In order to accomplish the above object, the present invention provides a laptop-size high-order harmonic generation apparatus using near field enhancement, the apparatus including a femtosecond laser generator; light transfer means for transferring light output from the femtosecond laser generator; micro patterns formed of metallic thin films and configured to have nano-sized apertures for generating near field enhancement when the light output from the light transfer means passes through the micro patterns; a gas supply unit for supplying inert gas to the light when the light transferred through the light transfer means passes through the micro patterns; and a vacuum chamber for accommodating the micro patterns and the gas supply unit under a vacuum atmosphere.

Preferably, the micro patterns are formed of any one selected from the group consisting of gold (Au), silver (Ag) and aluminum (Al).

Preferably, the micro patterns are each formed using one of a method in which the metallic thin films having a bowtie or square shape are disposed to face each other at a predetermined interval, thereby forming a nano-sized aperture, and a method in which nano-sized apertures having a circular shape are stacked one on top of another at a specific interval, thereby forming nano-sized apertures.

Preferably, the micro patterns have a length in a range of 160 to 200 nm and an interval in a range of 20 to 30 nm when the metallic thin films having a bowtie or square shape are disposed to face each other at a predetermined interval in order to form the one or more nano-sized apertures.

Preferably, the micro patterns are configured to enable a near field enhancement factor to be 20 dB or more and a light intensity to be $10^{13}$ W/cm$^2$ or more near the micro patterns.

Preferably, the gas supply unit supplies any one selected from the group consisting of inert gases, including Ar, Ne and Xe, and a mixed gas thereof near the micro patterns through a micro nozzle in gas or fluid form.

Preferably, the light transfer means further includes a focusing lens for condensing the light output from the femtosecond laser generator and focusing the light on the micro patterns; and wedge prisms and chirped mirrors for compensating for dispersion of the light output from the femtosecond laser generator.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

A laptop-size high-order harmonic generation apparatus using near field enhancement according to a preferred embodiment of the present invention will now be described in detail with reference to the accompanying drawings.

Figure 1:
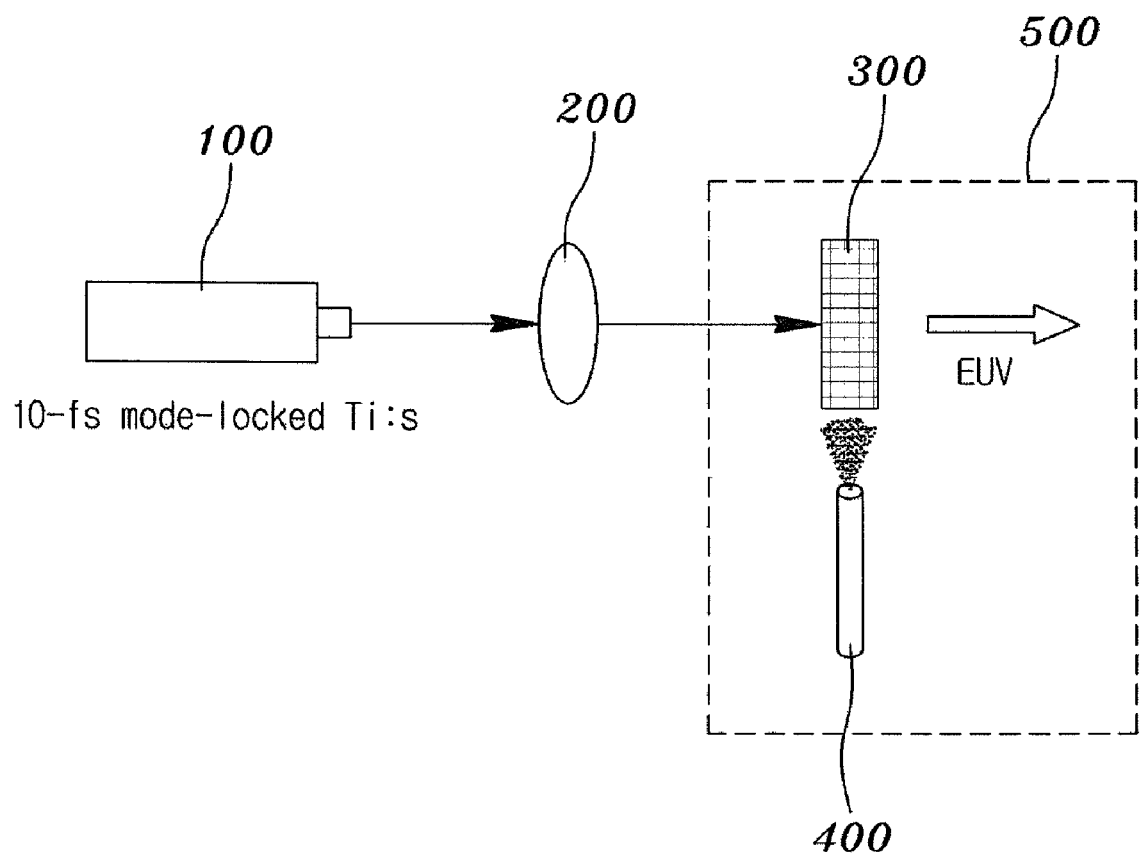
FIG. 1 is a schematic diagram showing a high-order harmonic generation apparatus using near field enhancement according to the present invention.
Figure 2:
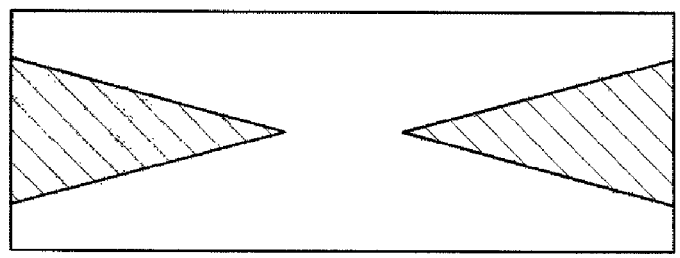
FIG. 2 is an enlarged view showing several embodiments of micro patterns that generate near field enhancement according to the present invention.
Figure 2:
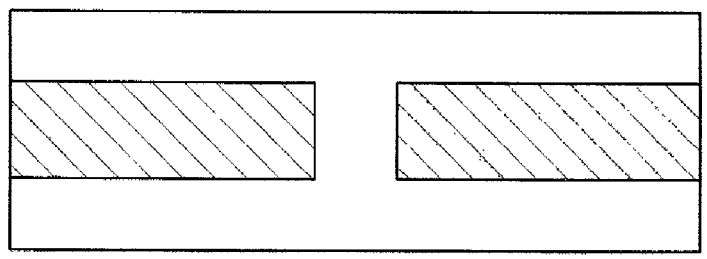
Figure 2:
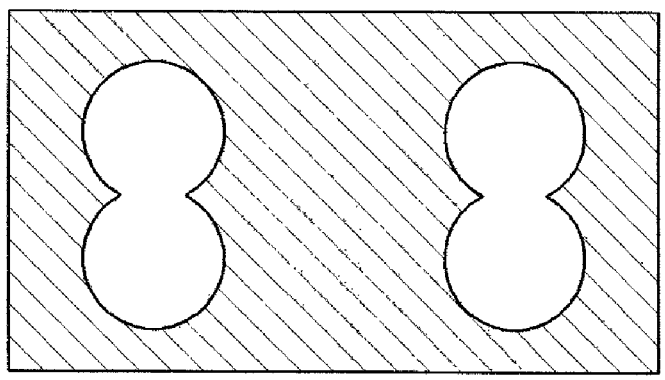
Figure 3:
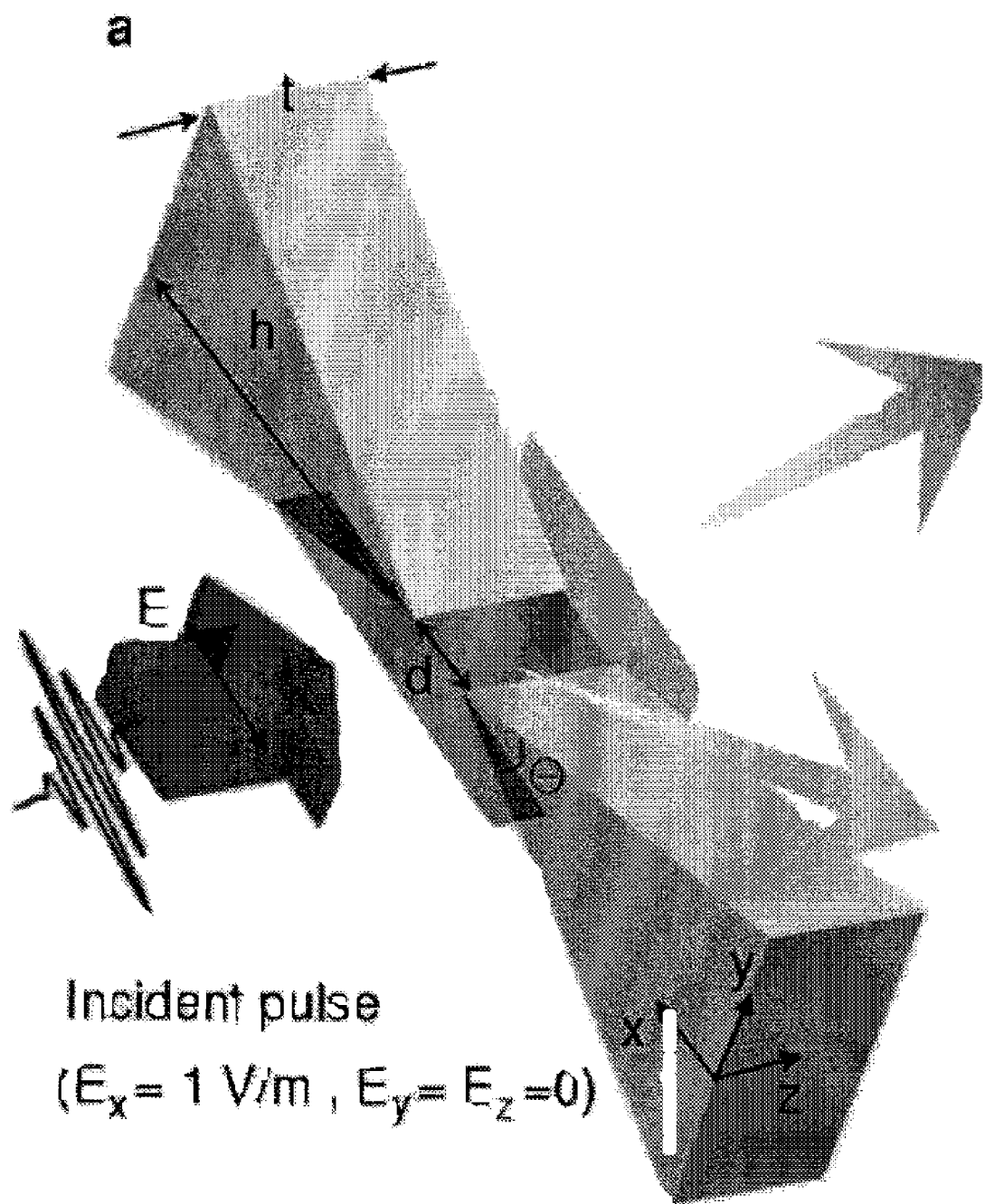
FIG. 3 is an enlarged view showing an embodiment of a micro pattern according to the present invention.

FIG. 1 is a schematic diagram showing a high-order harmonic generation apparatus using near field enhancement according to the present invention. FIG. 2 is an enlarged view showing several embodiments of micro patterns that generate near field enhancements according to the present invention. FIG. 3 is an enlarged view showing an embodiment of a micro pattern according to the present invention.

Figure 4:
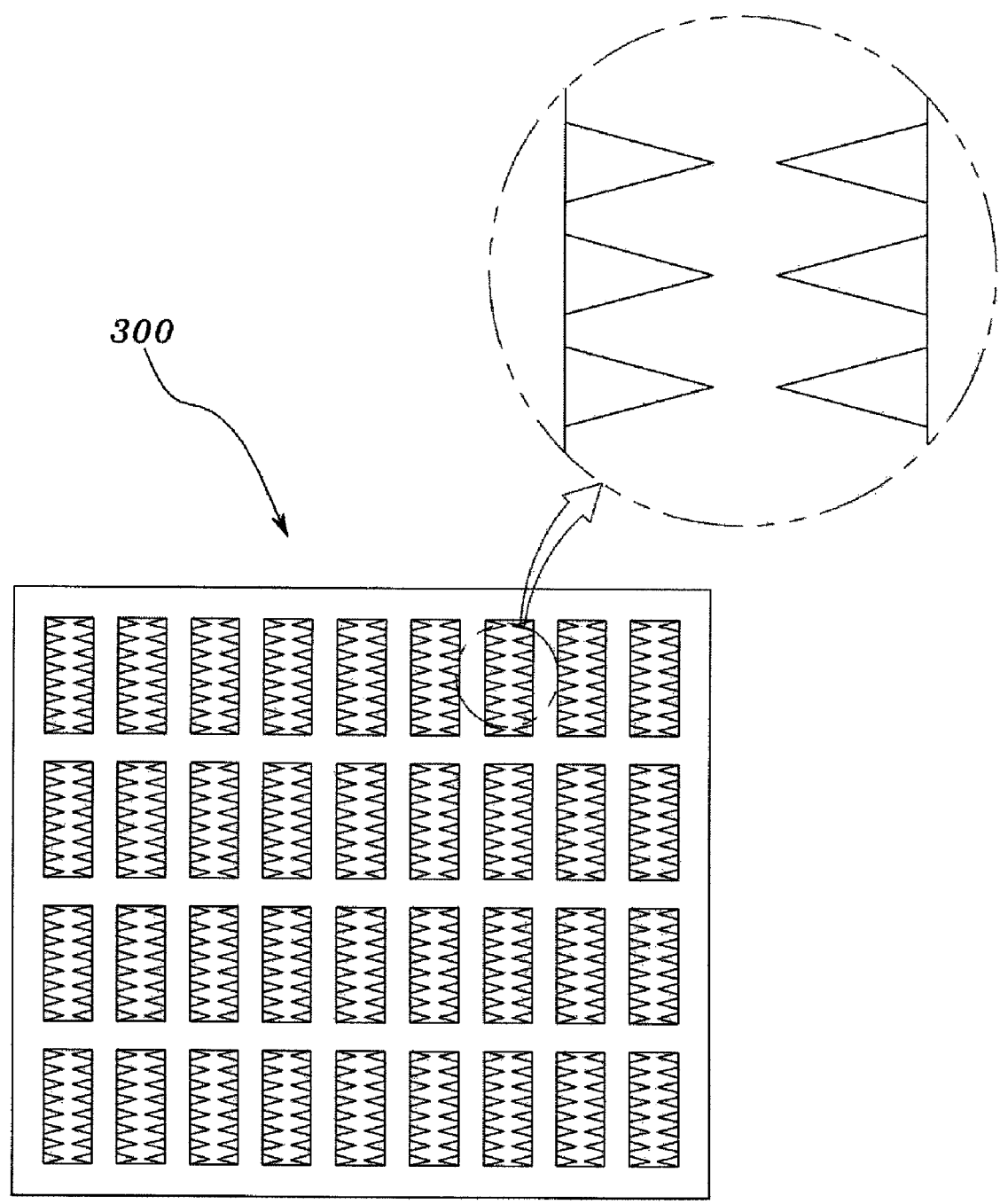
FIG. 4 is an enlarged view showing a preferred embodiment of micro patterns of the high-order harmonic generation apparatus using near field enhancement according to the present invention.
Figure 5:
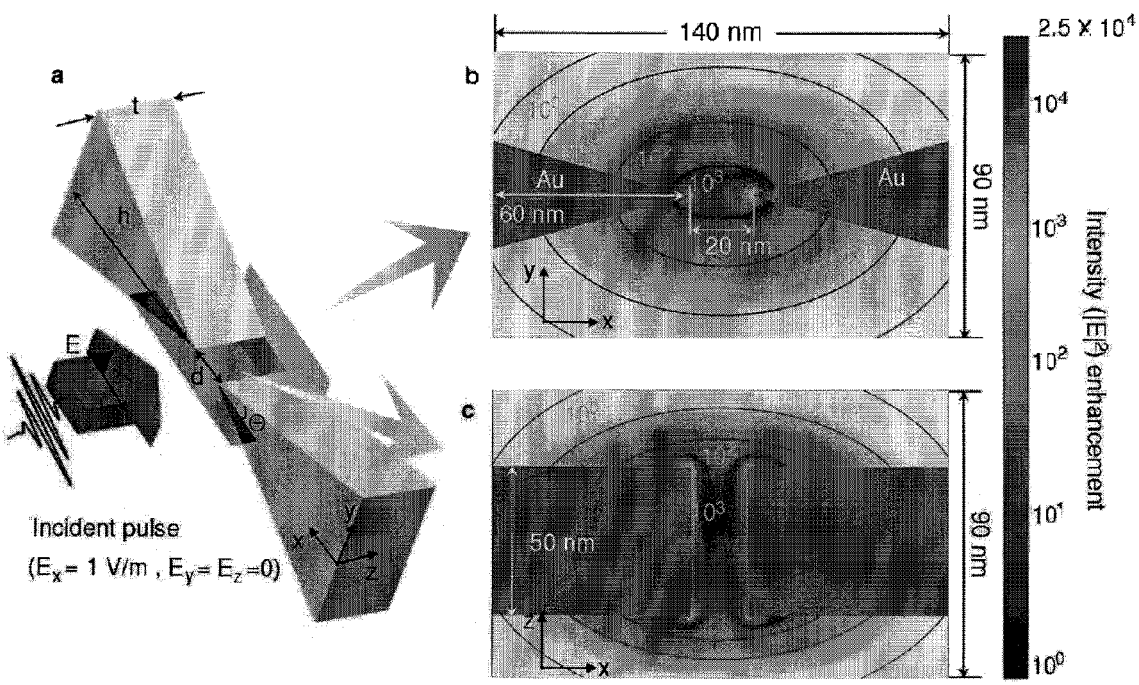
FIG. 5 is a diagram showing the enhancement of radiated light using near field enhancement in the micro patterns according to the present invention.
Figure 6:
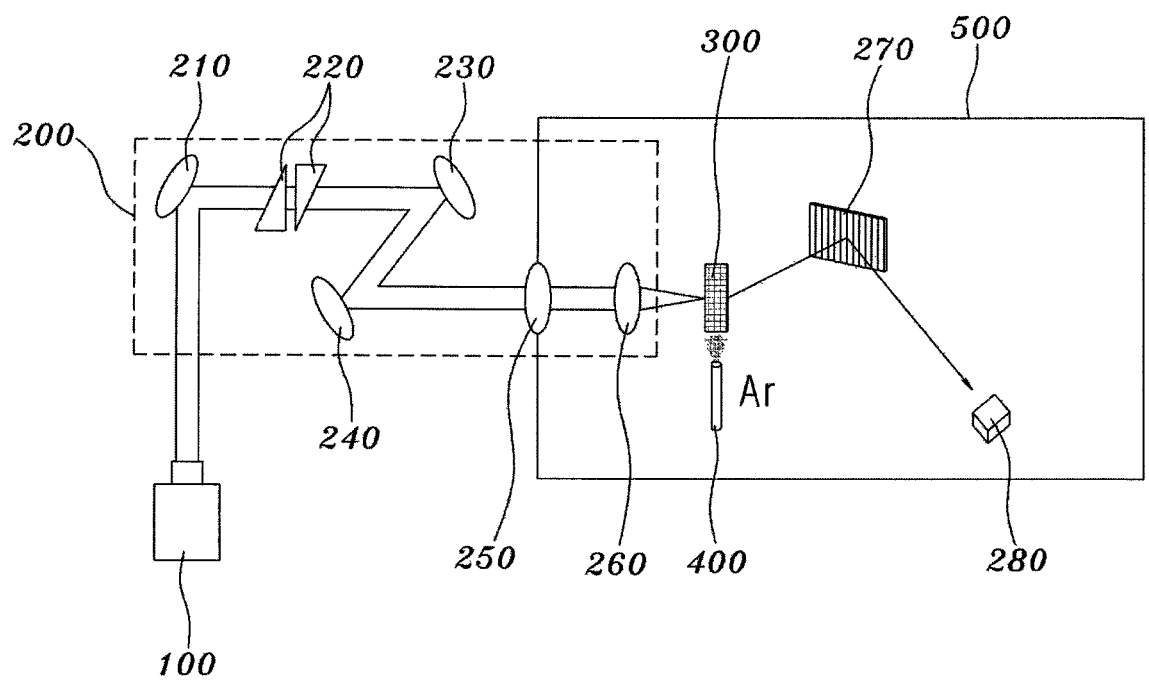
FIG. 6 is a diagram showing the detailed construction of the high-order harmonic generation apparatus using near field enhancement according to the present invention.

FIG. 4 is an enlarged view showing a preferred embodiment of micro patterns of the high-order harmonic generation apparatus using near field enhancement according to the present invention. FIG. 5 is a diagram showing the enhancement of radiated light using near field enhancement in the micro patterns according to the present invention. FIG. 6 is a diagram showing the detailed construction of the high-order harmonic generation apparatus using near field enhancement according to the present invention.

The laptop-size high-order harmonic generation apparatus using near field enhancement according to the present invention includes a femtosecond laser generator 100 for outputting a femtosecond laser beam, light transfer means 200 for transferring the laser beam output from the femtosecond laser generator 100, metallic micro patterns 300 for enabling the laser beam, received through the light transfer means, to be enhanced through a near field phenomenon, and a gas supply unit 400 for supplying inert gas to the laser beam when the laser beam passes through a micro pattern.

The femtosecond laser generator 100 is a laser oscillator for generating a light intensity of about $10^{11}$ W/cm$^2$, and is configured to output a femtosecond laser beam as source light for generating high-order harmonics according to the present invention.

In a preferred embodiment of the present invention, the femtosecond laser generator 100 has a femtosecond pulse width of 10, and is configured to output a femtosecond laser beam through a laser oscillator using titanium sapphire Ti:S as a laser gain medium. The conditions for a femtosecond laser, such as a pulse width and a wavelength, may vary according to various embodiments, such as an optical fiber-based femtosecond laser, depending on the purpose of use and the environment in which it is used.

The femtosecond laser generated by the femtosecond laser generator has a laser repetition rate of several MHz or more, a maximum energy of several nJ per pulse and a maximum light intensity of $10^{13}$ W/cm$^2$ or less, and can be stabilized in an atomic clock.

The light transfer means 200 is used to appropriately transfer light output from the femtosecond laser generator 100. In order to transfer light to the micro patterns 300 used for near field enhancement, the light transfer means 200 may schematically include a mirror, wedge prisms for compensating for the dispersion of light, which may occur in several optical components, chirped mirrors, and a focusing lens for condensing incident light. Those skilled in the art may vary such light transfer means 200 in various forms depending on design.

The micro patterns 300 are a component for enabling light, transferred through the light transfer means 200, to be subjected to near field enhancement.

Near field enhancement can be achieved in a very narrow region within several tens of nm or less below the surface of a medium. The basic theory thereof can be explained based on surface plasmon resonance and lightning-rod effects. When light is incident on the boundary between metallic and dielectric materials, surface electrons are induced at the boundary. If the movement of an incident wave and surface electrons meets the resonance conditions, a surface wave is generated. This is known as the surface plasmon resonance effect.

If the surface electrons induced by the incident light gather at a pointed tip of each micro pattern 300 having nano-sized apertures, the density of surface electrons abruptly increases, so that a great enhancement can be achieved. This is called the lightning-rod effect. That is, the lightning-rod effect corresponds to a phenomenon that is generated through the interaction between the light incident on a medium and the electrons. The surface plasmon resonance effect has a close relationship with the dielectric constant of a metallic medium, and the lightning-rod effect has a close relationship with the shape of a medium.

The conditions for the achievement of the optimized enhancement of light through the micro patterns 300 may include the dielectric constant of a medium, the wavelength and polarized direction of incident light, and the shape and size of a medium. With regard to the dielectric constant of a metallic medium, enhancement is great when the real value of the dielectric constant is negative and the imaginary value thereof is small. Metallic media that best meet these conditions are silver (Ag), gold (Au) and aluminum (Al). The micro patterns 300 may be fabricated using one of the metals.

Here, Ag enables ease enhancement because it has an amplification factor better than that of Au and has the imaginary value of its dielectric constant lower than that of Au. However, in a preferred embodiment of the present invention, Au is used as the material of the micro patterns 300 because it is less vulnerable to oxidization than Ag, and thus it has been chemically stabilized.

The micro patterns 300 formed of the above material include nano-sized apertures having a size smaller than that of the wavelength of light. Although the micro patterns 300 are formed of metallic thin films and have nano-size apertures having a size smaller than that of a wavelength, the amount of light transmission of the micro patterns 300 increases significantly.

Methods of fabricating the micro patterns 300 in consideration of the above-described requirements may be divided into two types. That is, a first method is to form micro patterns having nano-sized apertures by depositing metal on a substrate, such as a glass substrate, and a second method is to directly form nano-sized apertures in a single metallic thin film without using a glass substrate.

The method using a single metallic thin film can eliminate loss attributable to the absorption and reflection of a laser beam due to a glass substrate at the time of focusing of the laser beam because the glass substrate is not used. Furthermore, since the nano-sized apertures are formed through the metallic thin film, there is an advantage in that the method can be applied to a test of reaction between an enhanced laser beam and a fluid or gas that passes through the nano-sized apertures. Accordingly, the present invention uses micro patterns formed of a single metallic thin film.

Here, as shown in FIG. 2, the nano-sized apertures of the micro patterns 300 may be formed using various methods, such as a method in which two metallic thin films having a bowtie shape (see FIG. 2A) or a square shape (see FIG. 2B) are arranged at a specific interval, thereby forming a nano-sized aperture therebetween, or a method in which two circular apertures are stacked one on top of another at a specific interval, thereby forming figure-8 shapes (see FIG. 2C).

FIG. 3 shows a micro pattern having a nano-sized aperture through a bowtie-shaped metallic thin film according to an embodiment of the present invention. In FIG. 3, two triangles are arranged to face each other at a specific interval. Here, in order to meet a minimum light intensity of $10^{13}$ W/cm$^2$ for generating high-order harmonics using the micro pattern, the height 'h' and thickness 't' of each of the triangles, the interval 'd' between the two triangles and the vertex angle θ of each of the triangles must be adjusted appropriately because the amplification factor varies depending on the four values. Accordingly, an attempt to meed a minimum light intensity of $10^{13}$ w/cm$^2$ necessary for the generation of high-order harmonics using the micro patterns.

FIG. 4 shows micro patterns formed in bowtie form according to a preferred embodiment of the present invention. A femtosecond laser beam must be enhanced 100 times or more in order to achieve near field enhancement because the light intensity of the femtosecond laser beam is $10^{11}$ W/cm$^2$ and the minimum light intensity necessary to generate high-order harmonics is $10^{13}$ W/cm$^2$.

Accordingly, in consideration of the fact that a femtosecond laser beam must be enhanced 100 times or more, optimal design values for each of the nano-sized apertures, which were obtained through electromagnetic simulations using Finite-Difference Time-Domain (FDTD), include a thickness of 50 nm, an interval of 20 nm, a height of 175 nm, and a vertex angle of 30°.

Through the above process, the design was made such that an amplification factor of 100 or more was achieved within about the 60 nm×50 nm region of each micro pattern 300, and the maximum amplification factor was about 500 or more at the vertices of two triangles that face each other. Based on this design, the bowtie-shaped micro patterns were arranged within a region of 10 μm×10 μm in two dimensions using a focused ion beam method, and were formed to have a pitch of 200 nm in the polarization direction of incident light and a pitch of 500 nm in the vertical direction thereof.

The above-described design of the micro patterns is only an embodiment of the present invention, and may be modified to be of various configurations capable of obtaining required amplification factors through various shapes and design values that are obtained through FDTD electromagnetic simulations.

Since these EUVs and X-rays are greatly absorbed in the air, the generation of high-order harmonics using the micro patterns must be performed under a vacuum atmosphere. Accordingly, the micro patterns 300 for generating near field enhancement are included within a vacuum chamber along with a focusing lens included in the light transfer means, thereby causing light condensed by the focusing lens to be incident on the micro patterns.

FIG. 5 shows the distribution of the intensity of light that was actually enhanced using the bowtie-shaped micro patterns and the square-shaped micro patterns. These tests were performed on the bowtie-shaped micro patterns in an Au thin film having a thickness of 50 nm using a femtosecond laser beam having a center wavelength of 800 nm and a pulse width of about 10 fs.

Variables capable of achieving an optimal amplification value were obtained through FDTD analysis. The polarization direction of an incident laser beam is the X-axis direction. The reason for this is that in order to increase the density of resonant electrons, the pointed direction of the vertices must be parallel to the direction of the movement of electrons and an X-axis direction of polarization meets this condition.

In the case where each of the micro patterns has a bowtie or square shape, it is preferred that the nano-sized apertures be formed such that the metallic thin films are disposed to face each other at a predetermined interval and have a length in the range of 160 to 200 nm and an interval in the range of 20 to 30 nm.

The micro patterns enable a near field enhancement factor to be 20 dB or more and the intensity of femtosecond laser light to be $10^{13}$ W/cm$^2$ or more near the micro patterns without the use of a separate laser light source or resonator.

The gas supply unit 400 is used to amplify light passing through the micro patterns by supplying inert gas to the micro patterns 300. In the generation of high-order harmonics, electrons are ionized by applying a high time-varying electric field to an inert gas, such as Ar, Ne or Xe, or a mixed gas thereof, are moved along trajectories, and are then recombined, so that energy corresponding to the sum of the ionization energy and kinetic energy of the electrons is generated as light in the EUV or X-ray band.

The gas supply unit 400 may use various inert gases other than Ar, Ne and Xe. The present invention is not limited to gases supplied through the gas supply unit 400, but a fluid may be used. The inert gas may be supplied through a micro nozzle.

FIG. 6 is a diagram showing the construction of a high-order harmonic generation apparatus using near field enhancement according to an embodiment of the present invention. As shown in this drawing, the high-order harmonic generation apparatus basically includes the femtosecond laser generator 100, the light transfer means 200, the micro patterns 300 and the gas supply unit 400, which are disposed within a vacuum chamber, a diffraction grid 270 for spectroscoping the light of EUVs or X-rays generated through the micro patterns 300, and a photon detector 280 for acquiring a spectrum.

The femtosecond laser generator 100 uses a laser source having the same conditions described above. A laser beam output from the femtosecond laser generator 100 is reflected from a mirror 210, passes through wedge prisms 220, passes through a first chirped mirror 230 and a second chirped mirror 240, and then enters the vacuum chamber through a window mirror 250 that is provided on the vacuum chamber.

The light entering through the window mirror 250 is condensed by a focusing lens 260 within the vacuum chamber, and is then focused on a specific region. Thereafter, the light is incident on the micro patterns 300, and is enhanced to a critical value for generating high-order harmonics through near field enhancement.

If Ar gas is made to flow through the gas supply unit when the light condensed through the focusing lens 260 is radiated onto the micro patterns 300, a greater enhancement effect is achieved through interaction and EUVs are generated.

Here, the generated EUVs (high-order harmonics) basically have a frequency that is an odd-number of times (n=3, 5, 7, . . . ) that of a femtosecond laser beam. The light source generates EUV rays having an odd-order wavelength between about 10 nm and 200 nm.

Meanwhile, the generated EUVs are spectroscopied through the diffraction grid 270, and the spectrum thereof can be obtained through the photon detector 280.

According to the present invention, the apparatus constructed and configured to operate as described above can be reduced to a laptop size through a simple structure using only a femtosecond laser beam and nano-sized micro metallic patterns without the need for large-scale facilities using a synchrotron or complicated equipment using an external resonator. Accordingly, the present invention is advantageous in that it can be used in the high-tech industry and the fields of the basic sciences in various ways.

As described above, according to the present invention, the most significant advantage of the apparatus constructed and configured to operate as described above is that the apparatus can be reduced to small size through a simple structure because the generation of high-order harmonics can be achieved by fabricating micro patterns based on the near field enhancement theory, rather than using an external optical amplifier.

Furthermore, according to the present invention, an EUV or X-ray light source having a high repetition rate can be generated. Accordingly, the present invention has a variety of applications, such as precision spectroscopy, a next-generation exposure light source, biotechnology, and a light source for nondestructive testing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A laptop-sized high-order harmonic generation apparatus using near field enhancement, the apparatus comprising:
   a femtosecond laser generator;
   light transfer means for transferring light output from the femtosecond laser generator;
   micro patterns formed of metallic thin films and configured to have nano-sized apertures for generating near field enhancement when the light output from the light transfer means passes through the micro patterns;
   a gas supply unit for supplying inert gas to a region around the micro patterns when the light transferred through the light transfer means passes through the micro patterns; and
   a vacuum chamber for maintaining the micro patterns and the gas supply unit under a vacuum.

2. The high-order harmonic generation apparatus as set forth in claim 1, wherein the micro patterns are formed of one selected from the group consisting of gold, silver and aluminum.

3. The high-order harmonic generation apparatus as set forth in claim 2, wherein the micro patterns are configured to enable a near field enhancement factor to be at least 20 dB and a light intensity to be at least $10^{13}$ W/cm$^2$ near the micro patterns.

4. The high-order harmonic generation apparatus as set forth in claim 1, wherein the metallic thin films have sections disposed to face each other at a predetermined interval forming a nano-sized aperture, wherein each section has one of a bowtie shape and a square shape.

5. The high-order harmonic generation apparatus as set forth in claim 4, wherein the micro patterns have a length in a range of 160 to 200 nm and an interval in a range of 20 to 30 nm.

6. The high-order harmonic generation apparatus as set forth in claim 5, wherein the micro patterns are configured to enable a near field enhancement factor to be at least 20 dB and a light intensity to be at least $10^{13}$ W/cm$^2$ near the micro patterns.

7. The high-order harmonic generation apparatus as set forth in claim 4, wherein the micro patterns are configured to enable a near field enhancement factor to be at least 20 dB and a light intensity to be at least $10^{13}$ W/cm$^2$ near the micro patterns.

8. The high-order harmonic generation apparatus as set forth in claim 1, wherein nano-sized apertures having a circular shape overlap at a specific interval.

9. The high-order harmonic generation apparatus as set forth in claim 8, wherein the micro patterns are configured to enable a near field enhancement factor to be at least 20 dB and a light intensity to be at least $10^{13}$ W/cm$^2$ near the micro patterns.

10. The high-order harmonic generation apparatus as set forth in claim 1, wherein the micro patterns are configured to enable a near field enhancement factor to be at least 20 dB and a light intensity to be at least $10^{13}$ W/cm$^2$ near the micro patterns.

11. The high-order harmonic generation apparatus as set forth in claim 1, wherein the gas supply unit supplies one selected from the group consisting of inert gases, including Ar, Ne and Xe, and a mixed gas thereof near the micro patterns through a micro nozzle in one of a gas and a fluid form.

12. The high-order harmonic generation apparatus as set forth in claim 1, wherein the light transfer means further includes:
   a focusing lens for condensing the light output from the femtosecond laser generator and focusing the light on the micro patterns; and
   wedge prisms and chirped mirrors for compensating for dispersion of the light output from the femtosecond laser generator.

* * * * *